United States Patent [19]

Wurmb et al.

[11] 4,043,971

[45] Aug. 23, 1977

[54] THERMOPLASTIC POLYBUTYLENE TEREPHTHALATE MOLDING COMPOSITIONS OF IMPROVED TRACKING RESISTANCE

[75] Inventors: Rolf Wurmb, Heidelberg; Joachim Kunde, Frankenthal; Johannes Schlag, Ludwigshafen; Hans Georg Dorst, Deidesheim, all of Germany

[73] Assignee: BASF Aktiengesellschaft, Ludwigshafen, Germany

[21] Appl. No.: 678,946

[22] Filed: Apr. 21, 1976

[30] Foreign Application Priority Data

May 30, 1975  Germany ............................. 2524121

[51] Int. Cl.$^2$ ............................................. C08K 3/30
[52] U.S. Cl. ................................................. 260/40 R
[58] Field of Search ....................... 260/40 R, 45.7 ST

[56] References Cited

U.S. PATENT DOCUMENTS

| 3,516,957 | 6/1970 | Groz et al. .................... 260/40 R X |
| 3,673,139 | 6/1972 | Heach ............................ 260/40 R X |
| 3,953,394 | 4/1976 | Fox et al. ........................... 260/40 R |

OTHER PUBLICATIONS

S. Oleesky et al., *Handbook of Reinforced Plastics* (1964), pp. 216, 217, & 223.

*Primary Examiner*—Sandra M. Person
*Attorney, Agent, or Firm*—Keil, Thompson & Shurtleff

[57] ABSTRACT

Thermoplastic polybutylene terephthalate molding compositions containing calcium sulfate and/or barium sulfate to increase the tracking resistance.

4 Claims, No Drawings

THERMOPLASTIC POLYBUTYLENE TEREPHTHALATE MOLDING COMPOSITIONS OF IMPROVED TRACKING RESISTANCE

This invention relates to molding compositions based on filler-reinforced polybutylene terephthalates and distinguished by improved tracking resistance.

Thermoplastic polyesters of aliphatic diols and aromatic dicarboxylic acids are well known materials which are widely used, in particular, for the production of fibers for the textile industry. Such compounds are also becoming increasingly important as starting materials for the production of injection moldings. A particularly suitable compound of this kind is polybutylene terephthalate, which exhibits important advantages over other thermoplastic polyesters, for example polyethylene terephthalate, as regards injection molding properties. In particular, polybutylene terephthalate is much simpler to use in injection molding techniques than polyethylene terephthalate. For example, it is possible to injection mold polybutylene terephthalate at lower mold temperatures, for example temperatures of from about 30° to 80° C, in short cycle times to form highly crystalline and thus dimensionally stable injection moldings. Due to the high rate of crystallization, even at the lower temperatures, no difficulty is encountered in removal from the mold.

Furthermore, injection moldings made from polybutylene terephthalate are distinguished by good mechanical properties. In some applications, however, the rigidity and tensile strength of polybutylene terephthalate is inadequate. These mechanical properties may be improved by incorporating reinforcing fillers such as glass fibers, but this measure has the disadvantage that the incorporated reinforcing agents reduce the tracking resistance of the polybutylene terephthalate, which is not very high even without reinforcing agents. This is particularly undesirable when the molding compositions are to be used in the electrical industry.

It is an object of the present invention to provide filler-reinforced polybutylene terephthalates having good tracking resistance.

We have found, surprisingly, that the use of $CaSO_4$ and/or $BaSO_4$ as fillers for polybutylene terephthalate gives molding compositions having excellent tracking resistance even superior to that of polybutylene terephthalate containing no fillers. This is particularly surprising, since the use of similar fillers such as chalk ($CaCO_3$) leads to no such results. Even the use of calcium metasilicate, which according to German Published Application No. 2,256,699 provides polybutylene terephthalate molding compositions of improved arc resistance, gives only poor tracking resistance. For example, pure polybutylene terephthalate has a tracking resistance of 450 volts, as measured according to DIN No. 53,480, process KB, test solution A, whilst polybutylene terephthalate filled with 30% w/w of glass fibers has a tracking resistance of about 250 volts and the corresponding value for polybutylene terephthalate filled with 30% w/w of chalk is about 300 volts, whereas the tracking resistance of polybutylene terephthalate of the invention filled with 30% w/w of $CaSO_4$ or $BaSO_4$ is more than 600 volts.

The amount of $CaSO_4$ or $BaSO_4$ added is between 5 and 60% and preferably between 10 and 40%, by weight. The sulfates advantageously have a particle size of from 0.5 to 100 μm and preferably from 1 to 30 μm. The results are the same irrespective of whether natural or synthetic products are used. For example, the $CaSO_4$ used may be in the form of fibers.

The molding compositions may also contain other reinforcing agents, for example glass fibers.

The molding compositions of the invention contain polybutylene terephthalate which may be modified with up to 15% molar of other dicarboxylic acids or alcohols. Suitable modifying agents are, for example, aliphatic dicarboxylic acids of up to 20 carbon atoms, or cycloaliphatic or aromatic dicarboxylic acids with 1 or 2 aromatic rings. Examples thereof are adipic acid, sebacic acid, cyclohexanedioic acid, isophthalic acid and 2,7- and 2,6-naphthalene dioic acids.

Suitable alcoholic modifying components are, in particular, aliphatic and cycloaliphatic glycols of from 2 to 10 carbon atoms, for example ethylene glycol, propylene glycol, hexamethylene glycol, neopentyl glycol and 1,4-bis-hydroxymethylcyclohexane.

The polybutylene terephthalates used in the manufacture of the molding compositions of the invention generally have a K value of from 55 to 80 and preferably from 65 to 75, as measured by the method proposed by H. Fikentscher in Cellulosechemie 13, 58 (1932) on a 0.5% solution in a 3:2 v/v mixture of phenol and o-dichlorobenzene at 25° C.

In addition to the additives of the invention, the polybutylene terephthalate molding compositions of improved tracking resistance may contain other additives such as stabilizers counteracting thermal, thermooxidative and ultraviolet attack, dyes, pigments, flameproofing agents and processing auxiliaries ensuring trouble-free extrusion and injection molding.

The thermoplastic molding compositions are preferably produced by melting granular polybutylene terephthalate with incorporation of the fillers and homogenization in a suitable extruder, for example type ZSK by Werner & Pfleiderer, Stuttgart, extrusion into a coolant, granulation and drying.

The thermoplastic polybutylene terephthalate molding compositions of the invention are characterized by excellent tracking resistance. They are therefore suitable for use in the electrical and electronics industries.

EXAMPLES 1 TO 12

Granular polybutylene terephthalate having a K value of 72 was homogenized with the fillers listed in the Table below in a twin-shaft extruder at a material temperature of 250° C. The mixture was then extruded through a die and the extrudate was cooled and granulated.

The granules were injection molded at a material temperature of 260° C to round specimens having a thickness of 4 mm and a diameter of 80 mm. The tracking resistance was measured on said specimens according to DIN No. 53,480, method KB, test solution A.

TABLE

| Example | Additive | Tracking resistance |
|---------|----------|---------------------|
| 1 | — | 450 volts |
| 2 | 20% glass fibers | 250 volts |
| 3 | 30% glass fibers | 250 volts |
| 4 | 20% wollastonite ($CaSiO_3$) | 275 volts |
| 5 | 30% wollastonite ($CaSiO_3$) | 320 volts |
| 6 | 20% chalk ($CaCO_3$) | 450 volts |
| 7 | 30% chalk ($CaCO_3$) | 225 volts |
| 8 | 20% $CaSO_4 \cdot 0.5 H_2O$ | >600 volts |
| 9 | 30% $CaSO_4 \cdot 0.5 H_2O$ | >600 volts |
| 10 | 10% $BaSO_4$ | >600 volts |
| 11 | 20% $BaSO_4$ | >600 volts |
| 12 | 30% $BaSO_4$ | >600 volts |

The Examples 1 to 7 are comparative examples.

We claim:

1. Molding compositions of polybutylene terephthalate having improved tracking resistance and containing as fillers, $CaSO_4$, $BaSO_4$ or mixtures thereof in amounts of from 5 to 60% by weight of the total weight of the composition.

2. Molding compositions as claimed in claim 1 and containing $CaSO_4$ and/or $BaSO_4$ in amounts of from 10 to 40%, by weight of the total weight of the composition.

3. Molding compositions as claimed in claim 2 and additionally containing other reinforcing fillers.

4. Molding compositions as set forth in claim 1 wherein the $CaSO_4$ or $BaSO_4$ has a particle size of from 0.5 to 100 μm.